(12) United States Patent
Lindblade et al.

(10) Patent No.: US 10,046,834 B1
(45) Date of Patent: Aug. 14, 2018

(54) REPLACEABLE ELEMENT ROLLER BEARING ASSEMBLY

(71) Applicant: SOFEC, INC., Houston, TX (US)

(72) Inventors: Stephen P. Lindblade, Waller, TX (US); William Louis Fontenot, Houston, TX (US)

(73) Assignee: SOFEC, INC., Houston, TX (US)

( * ) Notice: Subject to any disclaimer, the term of this patent is extended or adjusted under 35 U.S.C. 154(b) by 0 days.

(21) Appl. No.: 15/678,905

(22) Filed: Aug. 16, 2017

(51) Int. Cl.
*B63B 21/00* (2006.01)
*B63B 21/50* (2006.01)
*F16C 19/38* (2006.01)

(52) U.S. Cl.
CPC .......... *B63B 21/507* (2013.01); *F16C 19/381* (2013.01); *F16C 2237/00* (2013.01); *F16C 2300/14* (2013.01); *F16C 2326/00* (2013.01); *F16C 2326/30* (2013.01)

(58) Field of Classification Search
CPC .................................................... B63B 21/507
See application file for complete search history.

(56) References Cited

U.S. PATENT DOCUMENTS

| | | | |
|---|---|---|---|
| 5,356,321 A | 10/1994 | Boatman et al. | |
| 5,372,531 A | 12/1994 | Boatman et al. | |
| 5,515,804 A | 5/1996 | Pollack | |
| 5,860,382 A | 1/1999 | Hobdy | |
| 5,893,784 A | 4/1999 | Boatman | |
| 6,477,974 B2 | 11/2002 | Hobdy | |
| 6,990,917 B2 | 1/2006 | Boatman et al. | |
| 7,063,032 B2 | 6/2006 | Lindblade et al. | |
| 7,347,156 B2 | 3/2008 | Lindblade | |
| 7,451,718 B2 * | 11/2008 | Boatman | B63B 22/026 114/230.12 |
| 7,510,452 B2 * | 3/2009 | Van Tol | B63B 21/508 441/5 |
| 8,197,293 B2 | 6/2012 | Gooijer et al. | |
| 8,671,864 B2 | 3/2014 | Lindblade et al. | |
| 8,950,349 B2 | 2/2015 | Lindblade et al. | |
| 9,334,902 B2 | 5/2016 | Hooper | |
| 2009/0324151 A1 * | 12/2009 | Craig | F16C 19/52 384/448 |
| 2010/0012010 A1 * | 1/2010 | Gooijer | B63B 21/50 114/230.1 |

(Continued)

*Primary Examiner* — Stephen P Avila
(74) *Attorney, Agent, or Firm* — Douglas W. Rommelmann; Bracewell LLP

(57) ABSTRACT

An arrangement for connecting a turret within a vessel opening such that the vessel is capable of rotation about a longitudinal axis of the turret. The arrangement including an inner ring assembly coupled to the turret and an outer ring assembly coupled to the vessel in concentric alignment with the inner ring assembly. A support row assembly connected between the inner and outer ring assemblies allows rotation of the outer ring assembly with respect to the inner ring assembly and axially transfers the weight of the turret to the vessel. A radial row assembly is coaxially disposed about the longitudinal axis between the inner and outer ring assemblies. A centralizer is disposed between the inner and outer ring assemblies. During normal operation the radial row assembly transfers any radial load from the vessel to the turret and the centralizer has a radial clearance with the outer ring assembly.

24 Claims, 5 Drawing Sheets

(56) References Cited

U.S. PATENT DOCUMENTS

2014/0050428 A1* 2/2014 Lindblade ............... F16C 21/00
                                                    384/127
2017/0120994 A1* 5/2017 Berle ..................... B63B 43/00
2018/0086422 A1* 3/2018 Boe ...................... B63B 21/507

* cited by examiner

REPLACEABLE ELEMENT ROLLER BEARING ASSEMBLY

CROSS-REFERENCE TO RELATED APPLICATIONS

Not applicable.

BACKGROUND OF THE INVENTION

1. Field of the Invention

This invention relates to a turret bearing structure and assembly for vessels such as offshore drilling or production vessels, and more particularly to a turret bearing structure and assembly including a bearing repair procedure that can be performed in situ.

2. Description of the Related Art

Vessel mooring systems are known in the art in which a vessel may weathervane about a turret that is moored to the sea floor. The vessel is supported for rotation with respect to the turret by turret bearing structures and assemblies placed between the turret and the vessel. Horizontal and vertical bearings transfer horizontal and vertical loads between the turret and the vessel.

The turret may be an internal turret or an external turret. An internal turret extends through a moon pool or cylindrical opening that extends through the hull of the vessel. An external turret is provided outside the hull of the vessel and fixed with suitable connection members to the bow or stern of the vessel.

Assignee's U.S. Pat. No. 8,671,864, to Lindblade et al. discloses an internal turret system. FIG. 1 of the '864 patent discloses a bow of a vessel having a moon pool extending through the vessel hull. Mounted within the moon pool is a turret about which the vessel weathervanes. The moon pool is normally of a circular cross-section, and the turret is typically of a cylindrical shape to fit within the moon pool. Anchor legs are connected to the turret and secured to the sea bed by suitable anchors to restrict rotation of the turret. Risers extend from subsea wellheads or distribution facilities on the sea floor and are connected to the turret. A manifold deck is supported on the upper end of the turret and includes valves connected to the risers. A swivel stack extends upwardly from the turret and manifold deck, and allows fluids to be transferred from the turret to the vessel. The turret is supported on the vessel by a turret bearing assembly.

One type of turret bearing assembly commonly used is an integrated three-row roller bearing assembly as shown and described in U.S. Pat. No. 5,893,784 to Boatman. The three-row roller bearing assembly includes a circular array of support rollers radially aligned about the turret for supporting the turret weight, referred to herein as the support row of the bearing. Any uplifting turret force is resisted by a second set of radially aligned rollers, referred to herein as the uplift row of the bearing. A third set of rollers, coaxially aligned about the turret, serves to transfer radial loads between the vessel and the turret, referred to herein as the radial row of the bearing. The three bearing rows of the three-row roller bearing assembly are preferably lubricated and sealed within a common volume by seals to provide protection from the elements and prevent corrosion. The integrated three-row roller bearing assembly is a precise assembly that requires a high degree of flatness for proper load distribution and is somewhat intolerant of distortions and deflections, which cause high point loading stresses on select rollers.

The reliability of three-row roller bearings in turret systems has been very good; however, when there are problems with these bearings, mitigation efforts can be extremely expensive and interruptive to production. Prior use of three-row roller bearings in turret applications typically does not provide for the ability to replace the rolling elements within the bearing without a very expensive process of taking the unit off station, to a shipyard and removing the bearing assembly by reversing the installation. Rolling elements are defined as the rollers, the roller cages or spacers, and wearable surfaces of the races on which the rollers roll. Bearing problems are most likely initiated at the interfaces of these rolling element components since this is where large stresses and wear occur.

With prior technology, three-row roller bearings for turret systems are not replaceable in situ and present significant risk to the system if problems with the bearing occur. When the requirement for a replaceable bearing exists, another technology such as wheel and rail bearings or bogey wheel bearings are typically used. Such wheel and rail and bogey wheel bearings present certain limitations that can make them less desirable than three-row roller bearings for certain turret systems.

A much more preferable solution would be replacement of the damaged three-row roller bearing in situ (i.e., at the location of the moored turret). One significant issue with rolling element replacement in situ is keeping the radial bearing inner race centered within the outer race during disassembly and reassembly of the bearing, and reacting radial load when the radial rollers are removed.

A previous attempt at designing a replaceable element three-row roller bearing in situ separated the rows of rollers into discrete bearings that could be replaced one at a time. The discrete bearings were designed into the structure to allow space for replacement. This discrete bearing design has not been field proven. U.S. Pat. No. 8,950,349 discloses a replaceable element three-row roller bearing in situ that separated the rows of rollers into discrete bearings that could be replaced one at a time. The bearing design in the '349 patent is a much larger implementation of a three-row roller bearing package that takes up more space and is more expensive.

U.S. Pat. No. 8,197,293, assigned to Bluewater Energy Services B.V., discloses initially installing a secondary bearing assembly in place and loading the secondary bearing assembly when the primary bearing assembly no longer functions. Including two complete bearing assemblies (one as a spare) takes up more space, is cost prohibitive—adversely affecting capital expense—and no further replacement is available in situ.

It would be desirable to be able to replace or repair a damaged turret three-row roller bearing assembly in situ. It would also be desirable to be able to replace or repair a damaged turret three-row roller bearing assembly while the vessel stays on station. It would be desirable to be able to remove the large vertical load from the existing bearing support row and allow the vessel to stay on station. It would also be desirable to be able to keep the inner race substantially centered within the outer race and react radial load when the radial rollers are removed.

SUMMARY OF THE INVENTION

The preferred embodiment of the present invention provides the ability to replace the wearable rolling elements, such as the rollers and the races, in situ. This greatly reduces the operational risks of potential bearing assembly problems. Since the rolling elements can now be replaced on site, this reduces the cost and risk associated with potential problems with the bearing assembly.

The present invention makes use of replaceable hardened steel race inserts and the bearing assembly is assembled in such a way that the rolling elements can be removed and replaced in situ. In addition, the bearing assembly is designed in such a way that it can be disassembled and reassembled in situ so that access to the rolling elements is available for replacement. Also, space around the outer diameter of the bearing assembly is built into the structure so that the rolling elements can be accessed. A lifting method of the turret is also included so that the main support rollers can be unloaded for removal. Another aspect of the invention is inclusion of a built in secondary radial bearing or centralizer to keep the radial bearing rings concentric during disassembly.

The present invention allows the bearing rolling elements to be replaced in situ, thereby mitigating the risk of bearing problems or failure and makes use of an integrated secondary radial bearing within the main bearing assembly to allow for centralization during the replacement process.

BRIEF DESCRIPTION OF THE SEVERAL VIEWS OF THE DRAWINGS

The invention is better understood by reading the detailed description of embodiments which follow and by examining the accompanying drawings, in which.

DESCRIPTION OF THE PREFERRED EMBODIMENTS

The present invention includes a three-row roller bearing assembly 10 within a turret (external or internal) that contains rolling elements that are replaceable in situ. Rolling elements are defined as the rollers, the roller cages or spacers, and wearable surfaces of the races on which the rollers roll. The bearing race provides a path on which the rollers roll. To realize the longest service life, the roller path of the bearing race needs to be as flat and round as possible allowing for a smooth load distribution upon the rollers themselves. Bearing problems are most likely initiated at the interfaces of these components since this is where large stresses, contact loads and wear occur.

Figure 1:
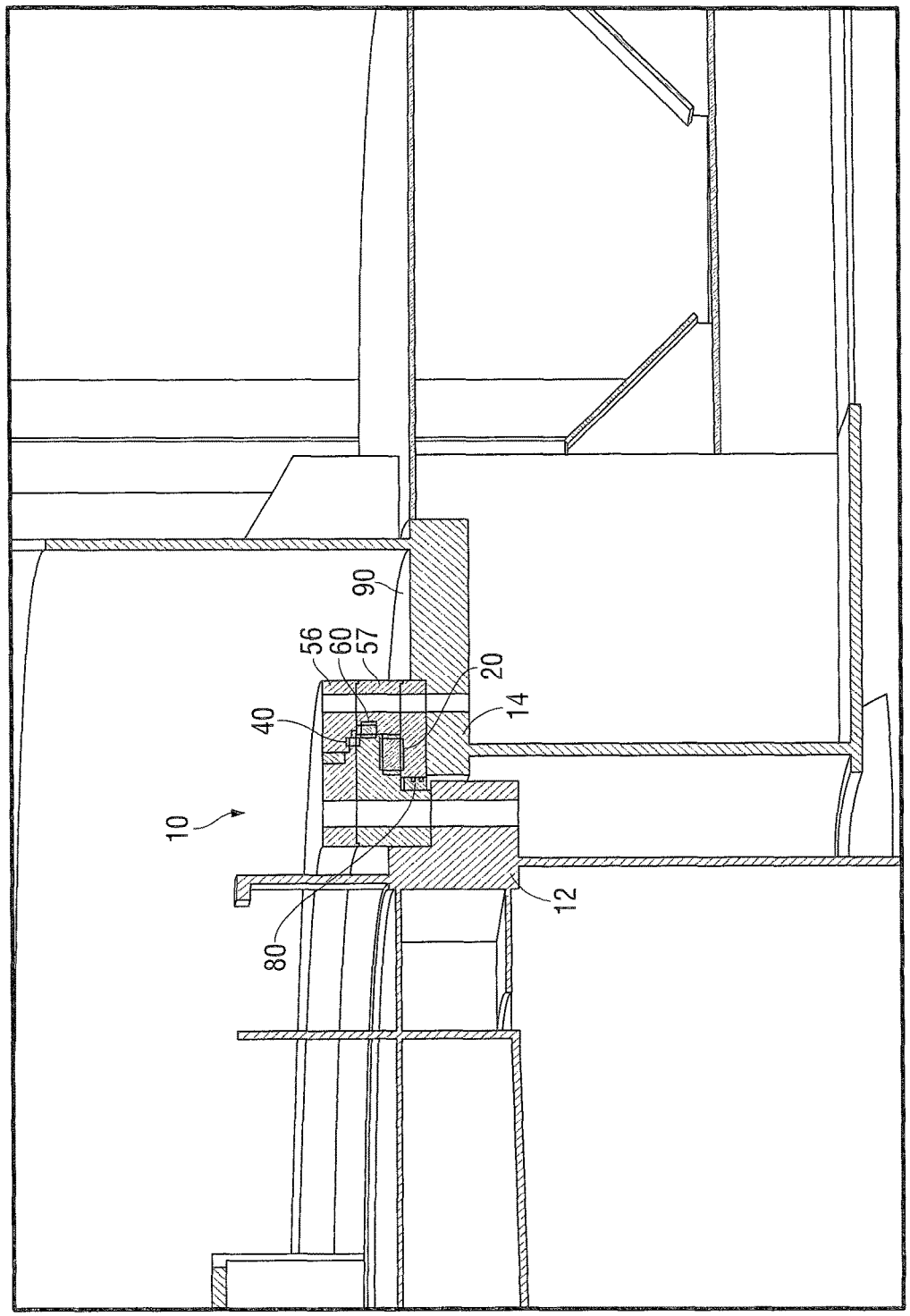
FIG. 1 is a partial elevation view in cross-section of an integrated three-row roller bearing assembly for rotatively coupling a turret within a moon pool of a vessel, showing upper and lower arrangements of radially aligned rollers for transferring axial forces and a mid co-axial arrangement of rollers for transferring radial loads all collocated within a single sealed, lubricated volume.

FIG. 1 depicts a cross-sectional view of a three-row roller bearing assembly 10 according to an embodiment of the present invention adapted for use on many turret systems. In this system, the turret has a three-row roller bearing assembly 10 installed to react loading acting between the turret, represented by turret structure 12, and turret supporting structure 14 of a floating vessel. It is to be understood that the turret supporting structure 14 is part of the floating vessel and has no movement relative to the floating vessel. The turret 12 is geostationary and has a longitudinal axis in a generally vertical direction. The floating vessel (including the turret supporting structure 14) is allowed to weathervane about the geostationary turret 12. The three-row roller bearing assembly 10 may be the only means of load transfer across this rotational interface.

Figure 2:
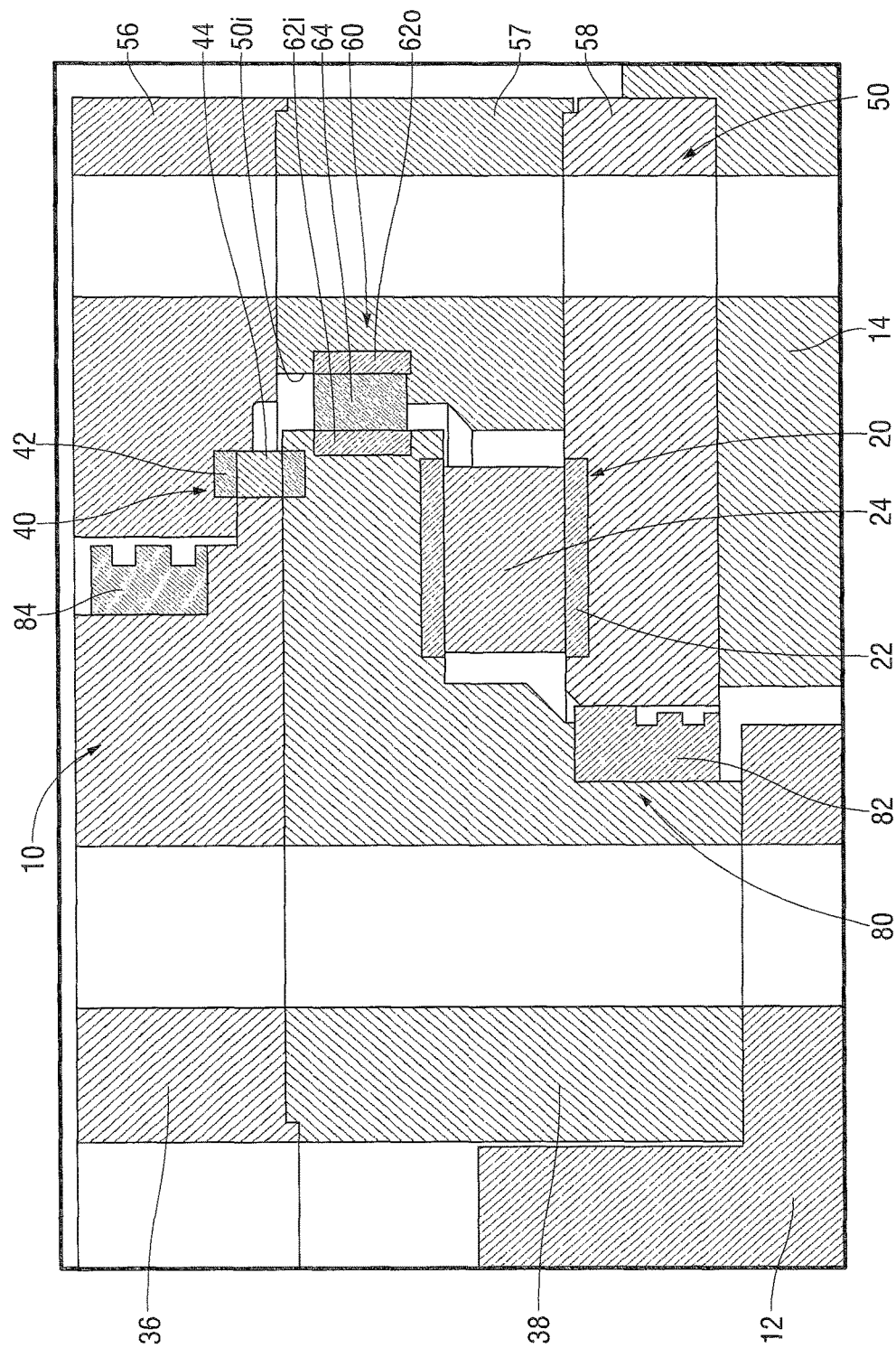
FIG. 2 is an enlarged view of a portion of FIG. 1.
Figure 5:
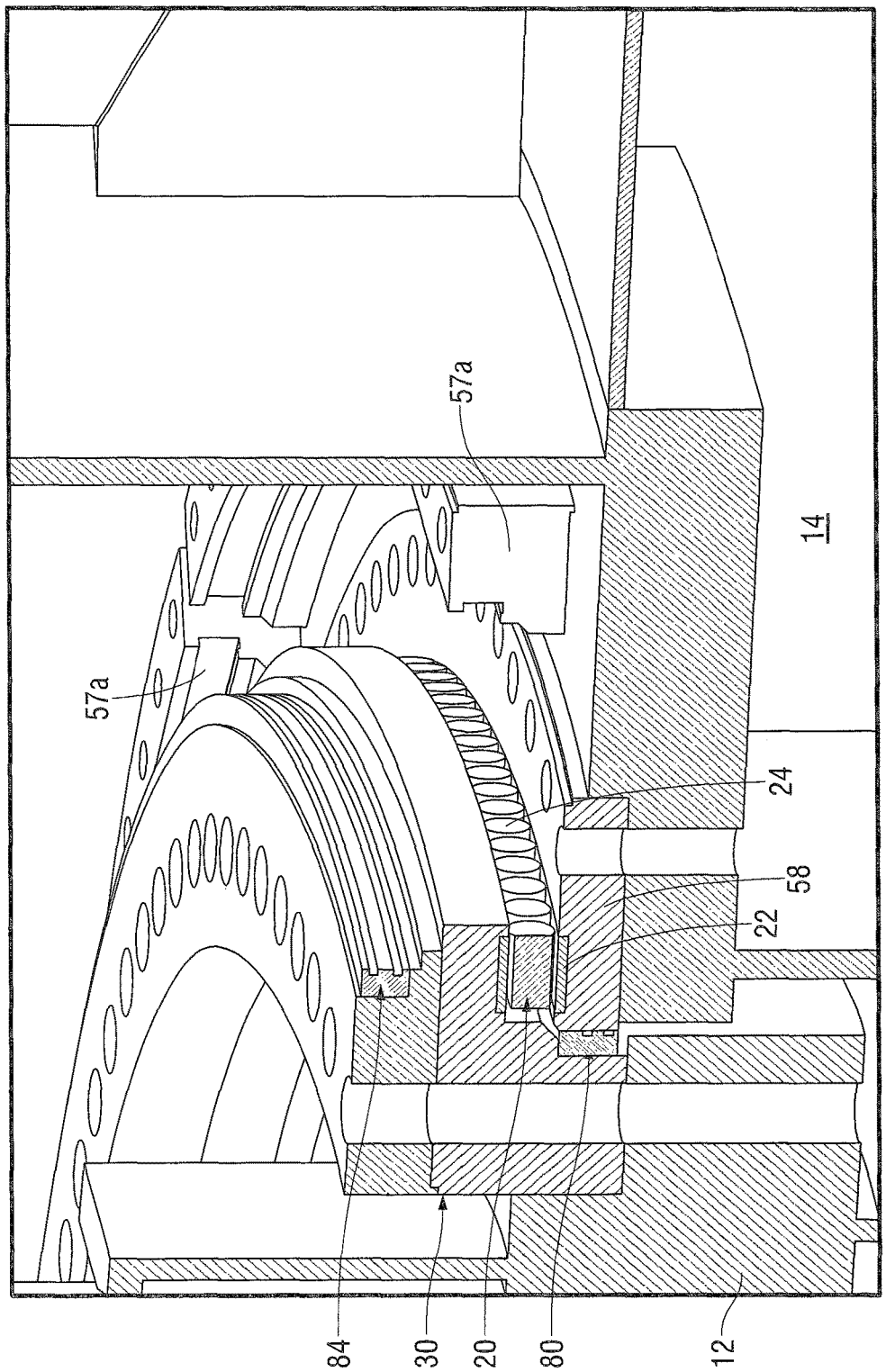
FIG. 5 is a partial perspective view of the integrated three-row roller bearing assembly in a disassembled state allowing for in situ replacement of main support rollers and races.

Referring to FIGS. 1 and 2, the three-row roller bearing assembly 10 includes a circular array of support rollers 24 with support races 22 and roller cages 26 (FIG. 3), all generally designated as support row assembly 20. The circular array of support rollers 24 are radially aligned about the turret 12 for supporting the turret weight as shown in FIG. 5. Any uplifting turret force is resisted by a second set of radially aligned rollers 44 with uplift races 42 and cages 46 (FIG. 3), all generally designated as uplift row assembly 40. A third set of rollers 64 with radial races 62o, 62i and cages or spacers (not shown), all generally designated as radial row assembly 60, coaxially aligned about the turret 12, serve to transfer radial loads between the vessel and the turret 12 during normal operation of the three-row roller bearing assembly 10. The third set of rollers 64 for transferring radial load typically have spacers between the rollers 64. However, sometimes the bearings are designed full complement, meaning there are no radial cages or spacers and just rollers 64.

The lower set of support rollers and races 20 are the most loaded when a downwardly acting axial force is applied. Of the three rows of roller bearings, the bearing support rollers and races 20 typically receive the most load and are the most likely to sustain damage in medium to deep water systems. For shallow water systems, the radial load can be quite high and the vertical load nominal. Thus, in shallow water systems, the bearing radial rollers and races 60 may be the most loaded and the most likely to sustain damage.

Figure 3:
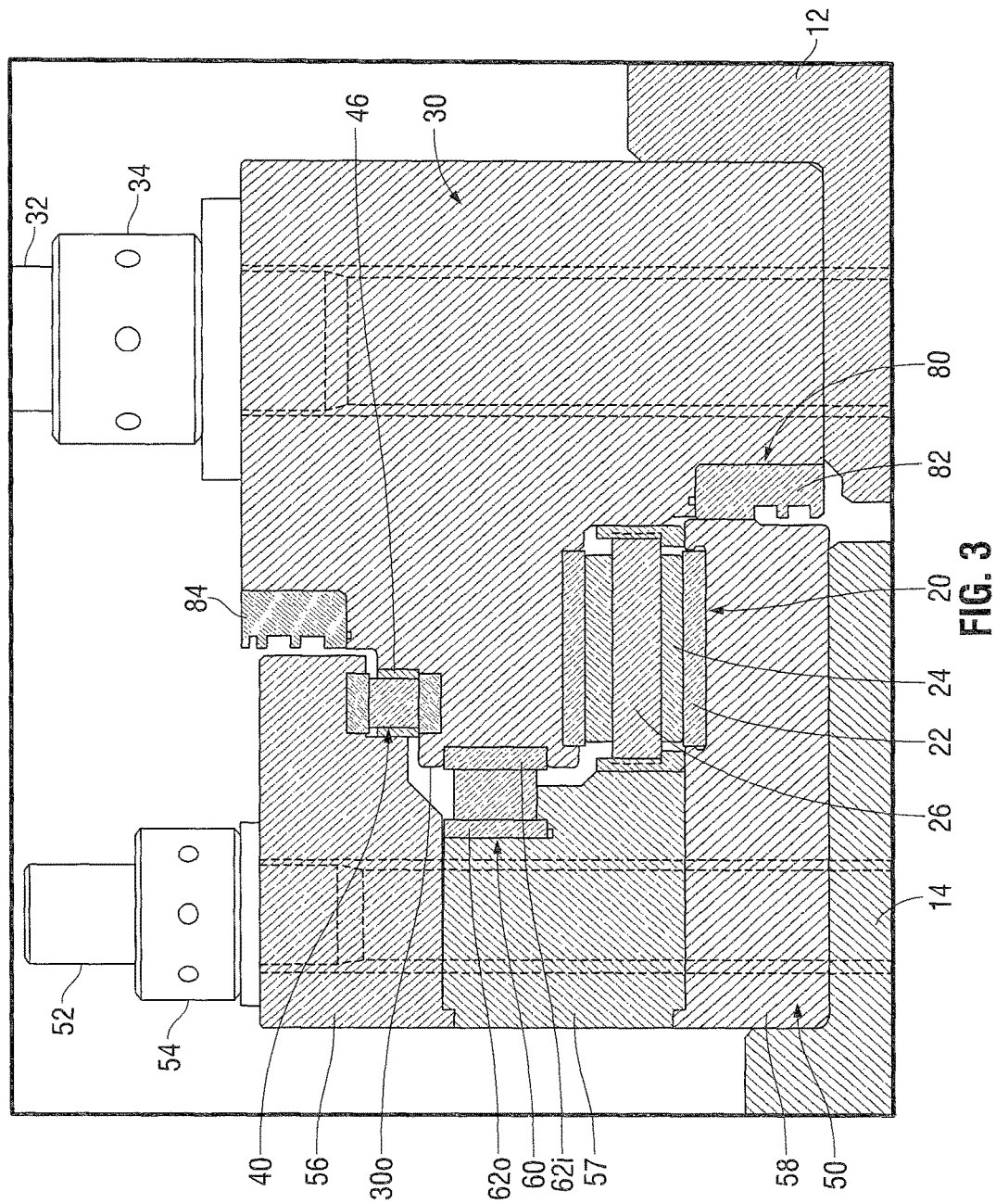
FIG. 3 is a view similar to FIG. 2, although inverted in position.

Referring to FIGS. 2 and 3, a bearing inner ring assembly 30 is secured to the turret structure 12 via a plurality of circumferentially-spaced fasteners, preferably threaded stud bolts 32 and nuts 34 (FIG. 3). A bearing outer ring assembly 50 is secured to the turret supporting structure 14 of the floating vessel via a plurality of circumferentially-spaced fasteners, preferably threaded stud bolts 52 and nuts 54.

In the preferred embodiment of the present invention, the bearing inner ring assembly 30 includes an upper inner ring 36 mounted on a lower inner ring 38 as shown in FIG. 2. In an alternate embodiment shown in FIG. 3, the bearing inner ring assembly 30 comprises a unitary ring, as opposed to the separate upper and lower inner rings 36 and 38.

The bearing outer ring assembly 50 includes an upper outer ring 56 mounted on a middle outer ring 57, which is mounted on a lower outer ring 58. The prior art outer ring assembly is typically in two layers—upper and lower—so that the roller bearing assembly can be assembled. In the preferred embodiment of the present invention, the outer ring assembly 50 is in three layers. Preferably, the upper and lower outer rings 56 and 58, respectively, are continuous or unitary rings and the middle outer ring 57 is segmented into equally divided segments 57a (for example 12, 16 or 24) so that they can be easily handled when removed. FIG. 5 shows a couple of middle outer ring segments 57a removed from the bearing assembly 10. The upper outer ring 56 is removed prior to removing the middle outer ring segments 57a. Preferably, the middle outer ring segments 57a are dowelpinned to the lower and upper outer rings 58 and 56 to ensure alignment during assembly and reassembly. In an alternate embodiment, the middle outer ring 57 may be a continuous ring if space is allowed for removal overhead.

Typically, in prior art bearings less than 8 meters in diameter, the hardened race surface is an induction hardened surface that is integral to the bearing forging ring. In the prior art, a hardened steel race insert is common with segmented bearings greater than 8 meters in diameter. In the preferred embodiment of the present invention, the hardened race surface is a hardened steel plate insert, referred to as a wire race, that is ground flat and sits inside of the bearing forging ring as shown in FIG. 3. Thus, races 22, 42 and 62 are wire races, each being replaceable, separate of the inner or outer ring assemblies 30 and 50.

The preferred embodiment of the present invention further includes a secondary radial bearing or centralizer 82 built into the bearing assembly 10. The secondary radial bearing/centralizer 82 is preferably part of a lower seal ring 80 and connected to the inner ring assembly 30. Preferably, the lower seal ring 80, including the centralizer 82, is made from a bronze sliding bearing material. The secondary radial bearing/centralizer 82 has sufficient radial clearance with the lower outer ring 58 so that during normal operation of the radial row assembly 60, the centralizer 82 is not radially loaded; however, during in situ repair of the bearing assembly 10 (discussed below), the centralizer 82 maintains the inner radial race 62i substantially concentric with the outer radial race 62o and reacts radial loads. An upper seal ring 84 contains elastomeric seals that form a fluid seal between the upper inner ring 36 and the upper outer ring 56 above the uplift rollers 44. The upper seal ring 84 and the lower seal ring 80 define a single sealed, lubricated volume in which the roller bearing assembly 10 resides.

With reference to FIGS. 2 and 3, the support rollers 24 are at an elevation above the centralizer 82 and the radial rollers 64 are at an elevation above the support rollers 24 in the preferred embodiment. Additionally, the uplift rollers 44 are preferably at an elevation above the radial rollers 64.

Currently in external turrets, there is no room to access the roller bearing assembly 10 from its outer diameter. In the preferred embodiment of the present invention, space 90 (FIG. 1) is provided on the outside of the outer diameter of the roller bearing assembly 10 so that access to the rolling elements is available by removing the outer rings 56 and 57.

Referring to FIG. 3, preferably the horizontal interface of the lower outer ring 58 and middle outer ring 57 adjacent the support row assembly 20 is slightly below the bottom of the support rollers 24. This facilitates the in situ replacement of the support rollers 24 as discussed below.

When it is desired to replace one or more sets of the rolling elements, the outer ring stud bolts 54 and nuts 52 are removed and the upper outer ring 56 is removed and stored overhead. With the upper outer ring 56 removed, the uplift rollers 44, races 42 and cage 46 are accessible and removable as best visualized in FIGS. 2 and 3.

Preferably, the inner race 62i of the radial row assembly 60 extends outwardly beyond the outermost radially-facing surface 30o of the inner ring assembly 30 above the inner race 62i as shown in FIG. 3. More preferably, also the outer race 62o of the radial row assembly 60 extends inwardly beyond the innermost radially-facing surface 50i (FIG. 2) of the outer ring assembly 50 above the outer race 62o. In this manner, upon removal of the upper outer ring 56, the radial rollers 64 may be removed. It may be necessary to "push" the turret radially to allow the unloaded radial rollers to be removed from the radial row assembly 60.

In the past, one of the main issues with replacement of radial rollers 64 was maintaining the inner radial race 62i centered within the outer radial race 62o and reacting radial load when the radial rollers 64 are removed. In the present invention this is handled by the secondary radial bearing/centralizer 82. Upon removal of the radial rollers 64, the secondary radial bearing/centralizer 82 reacts radial loads and maintains the inner radial race 62i substantially concentric with the outer radial race 62o, preferably to within approximately 1 mm.

If spacers (not shown) are present between the radial rollers 64, the spacers may also be removed with the radial rollers 64. If a radial cage (not shown) is present it will be removed to allow access to the radial rollers 64.

In order to remove and replace the support rollers 24, cages 26 and races 22, the middle outer ring 57 must be removed. Removal of the radial rollers 64 is required in order to raise and remove the middle outer ring 57 when the middle outer ring 57 is a unitary, continuous ring. The radial rollers 64 are also preferably removed prior to removing individual middle outer ring segments 57a.

Figure 4:
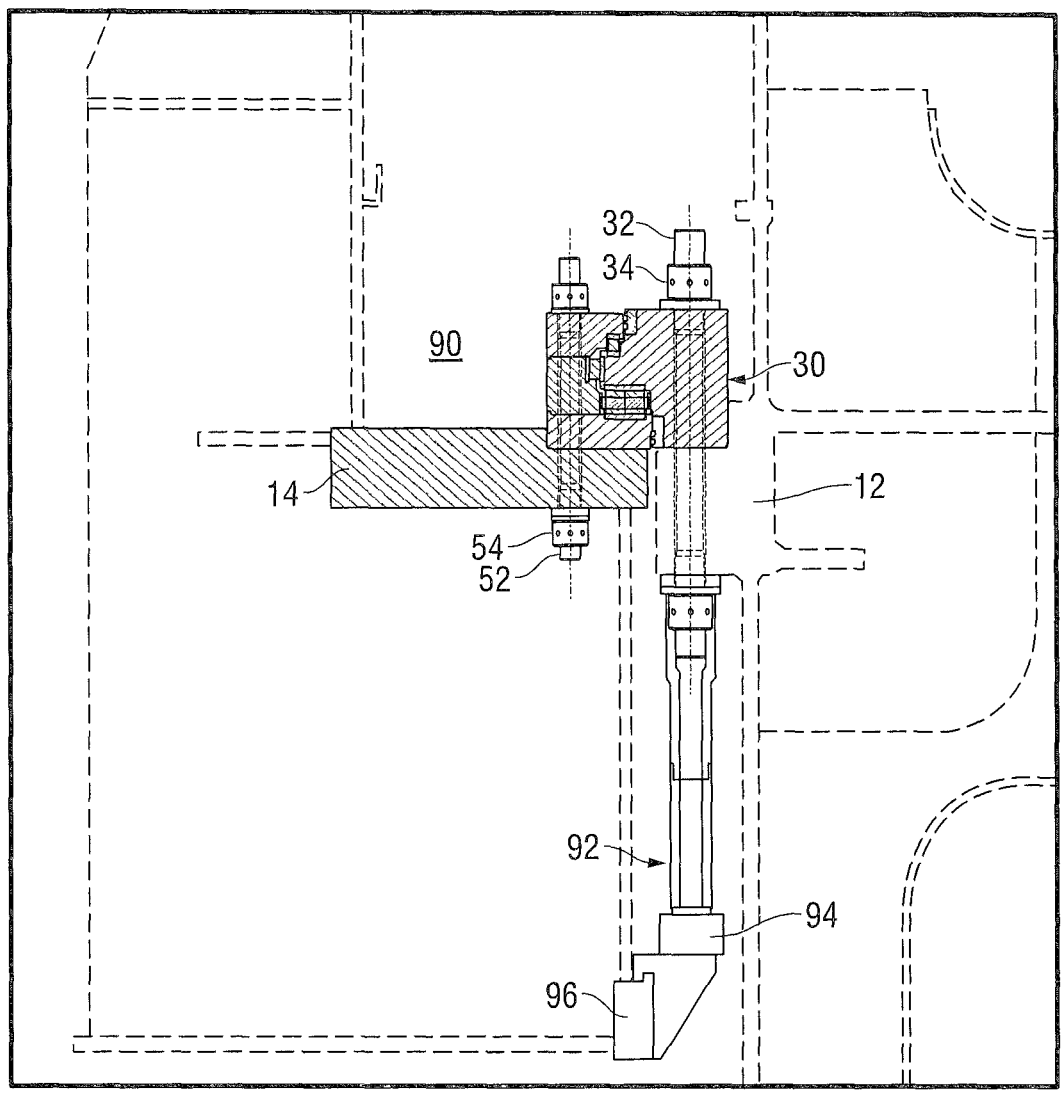
FIG. 4 is a view similar to FIG. 3 but also showing a turret jacking system.

In order to remove and replace the support rollers 24, cages 26 and races 22, the turret 12 is lifted with a jacking system 92 (FIG. 4) to remove the load from the main support rollers 24 and provide vertical space for removal. This only requires lifting the turret 12 a few millimeters. The jacking system 92 shown in FIG. 4 comprises a plurality of jacks 94, preferably hydraulic jacks, positioned below the inner ring stud bolts 32 and supported on a load support member 96, preferably an integrated ring of the vessel's turret supporting structure 14. The upper end of the plurality of jacks 94 may engage the lower inner ring nuts 34 and exert an upward force to the turret structure 12. In the preferred embodiment, the plurality of jacks 94 are simultaneously energized to lift the bearing inner ring assembly 30 and turret 12 relative to the lower outer ring 58. It is to be understood that lifting the turret 12 may alternatively be accomplished by other suitable means. During the lifting process and while the turret 12 is lifted, the turret will be rotationally locked and the vessel will have external means for heading control of the vessel.

By having the horizontal joint between the lower outer ring 58 and the middle outer ring 57 near, but preferably slightly below, the bottom of the main support rollers 24, when the middle outer ring 57 or middle outer ring segments 57a are removed, the main support rollers 24, cages 26 and races 22 are easily accessible as shown in FIG. 5. The lifting of the turret 12 a few millimeters via the jacking system 92 also raises the inner ring assembly 30 relative to the lower outer ring 58 to remove the vertical load from the support rollers 24 and increase the spacing between the support races 22, allowing the cages 26 with the support rollers 24 to be removed and replaced. Preferably, the races 22 would also be replaced on such a repair so that all the wearable rolling elements have new rolling surfaces. The centralizer 82 remains engaged with the lower outer ring 58 during this lift and repair of the support row assembly 20.

It is to be understood that the steel race inserts 22, 42 and 62 may be segmented and preferably about 1 to 1.5 meters long.

The three-row roller bearing assembly 10 is reassembled in substantially the reverse order. The support row assembly 20, preferably with new support races 22 installed in the lower outer ring 58 and the lower inner ring 38, is assembled with new support rollers 24 and cages 26. Via manipulation of the jacking system 92, the turret 12 and the inner ring assembly 30 is lowered relative to the lower outer ring 58 to place the vertical load on the support rollers 24. The centralizer 82 continues to react radial loads and maintain the inner radial race 62i substantially concentric with the outer radial race 62o.

New inner and outer radial races 62i and 62o may be installed in the lower inner ring 38 and the middle outer ring 57, respectively. The middle outer ring 57 (or ring segments 57a) is installed on top of the lower outer ring 58 and the radial rollers 64 (including spacers or cages, if any) are installed between the inner and outer radial races 62i and 62o. Upon the installation of the radial rollers 64, radial loads are transferred through the radial rollers 64 instead of through the centralizer 82.

New uplift races 42 may be installed in the lower inner ring 38 and the upper outer ring 56. With uplift cages 46 with rollers 44 positioned on the lower uplift race 42, the upper outer ring 56 may be positioned on top of the middle outer ring 57 and the outer ring stud bolts 54 and nuts 52 installed.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. An arrangement for in situ remediation of a bearing assembly rotatively coupling a vessel to a turret about a longitudinal axis of the turret, the arrangement comprising:
    an inner ring assembly structurally coupled to the turret defining a circular path about the longitudinal axis;
    an outer ring assembly structurally coupled to the vessel in concentric alignment with the circular path;
    a support row assembly connected between the inner and outer ring assemblies so as to allow rotation of the outer ring assembly with respect to the inner ring assembly and to axially transfer the weight of the turret to the vessel;
    an uplift row assembly for reacting against upward loads and disposed between the inner and outer ring assemblies;
    a radial row assembly coaxially disposed about the longitudinal axis between the inner and outer ring assemblies so as to transfer a radial load from the vessel to the turret; and
    a secondary radial centralizer disposed between the inner and outer ring assemblies, the secondary radial centralizer has a radial clearance with the outer ring assembly so that during normal operation of the radial row assembly, the secondary radial centralizer is not radially loaded,
    wherein the support row assembly includes an upper race, a lower race, and a plurality of support rollers disposed between and in contact with the upper and lower races with individual axes of the support rollers aligned on radii of the longitudinal axis.

2. The arrangement of claim 1, wherein the radial row assembly includes an inner race, an outer race, and a plurality of radial rollers disposed between and in contact with the inner and outer races,
    wherein the plurality of radial rollers may be removed from the radial row assembly in situ and the secondary radial centralizer then reacts radial loads and maintains the inner race of the radial row assembly substantially concentric with the outer race of the radial row assembly.

3. The arrangement of claim 1, wherein:
    the support row assembly is disposed at a first elevation; and
    the radial row assembly is disposed at a second elevation that is higher than the first elevation and higher than an elevation of the secondary radial centralizer.

4. The arrangement of claim 3, wherein the outer ring assembly comprises an upper outer ring, a middle outer ring and a lower outer ring, and the radial row assembly is disposed between the inner ring assembly and the middle outer ring.

5. The arrangement of claim 4, wherein the secondary radial centralizer is disposed between the inner ring assembly and the lower outer ring.

6. The arrangement of claim 5, wherein the radial row assembly includes an inner race, an outer race, and a plurality of radial rollers disposed between and in contact with the inner and outer races,
    wherein the plurality of radial rollers may be removed from the radial row assembly in situ and the secondary radial centralizer then reacts radial loads and maintains the inner race of the radial row assembly substantially concentric with the outer race of the radial row assembly.

7. The arrangement of claim 4, wherein the support row assembly is disposed between the inner ring assembly and the lower outer ring.

8. The arrangement of claim 7, wherein the support row assembly disposed at the first elevation is higher than the elevation of the secondary radial centralizer.

9. The arrangement of claim 7, further comprising:
    a jacking system arranged and designed to raise the turret relative to the vessel, the jacking system comprising a plurality of jacks vertically positioned between a load support member affixed to the vessel and a turret member.

10. The arrangement of claim 9, wherein the plurality of support rollers may be removed and replaced when the jacking system has raised the turret relative to the vessel in situ.

11. The arrangement of claim 9, wherein the secondary radial centralizer reacts radial loads and maintains the lower outer ring substantially concentric with the inner ring assembly when the jacking system has raised the turret relative to the vessel in situ.

12. The arrangement of claim 1, wherein the support row assembly, the uplift row assembly and the radial row assembly are disposed within a sealed volume.

13. An arrangement for in situ remediation of a bearing assembly rotatively coupling a vessel to a turret about a longitudinal axis of the turret, the arrangement comprising:
    an inner ring assembly structurally coupled to the turret defining a circular path about the longitudinal axis;
    an outer ring assembly structurally coupled to the vessel in concentric alignment with the inner ring assembly;
    a support row assembly connected between the inner and outer ring assemblies so as to allow rotation of the outer ring assembly with respect to the inner ring assembly and to axially transfer the weight of the turret to the vessel;
    a radial row assembly coaxially disposed about the longitudinal axis between the inner and outer ring assemblies; and a centralizer disposed between the inner and outer ring assemblies, wherein during normal operation the radial row assembly transfers any radial load from the vessel to the turret and the centralizer has a radial clearance with the outer ring assembly, and during in situ repair of the radial row assembly or the support row assembly the centralizer transfers any radial load from the vessel to the turret and maintains the outer ring assembly substantially concentric with the inner ring assembly.

14. The arrangement of claim 13, wherein the support row assembly and the radial row assembly are disposed within a sealed volume.

15. The arrangement of claim 13, wherein the support row assembly includes an upper race, a lower race, and a plurality of support rollers disposed between and in contact with the upper and lower races; and the radial row assembly includes an inner race, an outer race, and a plurality of radial rollers disposed between and in contact with the inner and outer races, wherein the plurality of radial rollers may be removed from the radial row assembly in situ and the centralizer then reacts radial loads and maintains the inner race of the radial row assembly substantially concentric with the outer race of the radial row assembly.

16. The arrangement of claim 15, wherein the plurality of support rollers may be removed from the support row assembly in situ and the centralizer reacts radial loads and maintains the outer ring assembly substantially concentric with the inner ring assembly.

17. The arrangement of claim 13, wherein the support row assembly and the radial row assembly are disposed within a sealed volume.

18. In a three row, roller bearing assembly rotatively coupling a vessel to a turret, the three row, roller bearing assembly having a support row assembly, a radial row assembly, an uplift row assembly and a centralizer disposed between an inner ring assembly connected to the turret and an outer ring assembly connected to the vessel, a method for in situ remediation of the damaged three row, roller bearing assembly, comprising the steps of:

removing an upper outer ring of the outer ring assembly;

removing a plurality of radial rollers from the radial row assembly;

maintaining substantial concentricity of the inner ring assembly with the remaining portion of the outer ring assembly; and transferring radial loads from the vessel to the turret via the centralizer.

19. The method of claim 18, further comprising the step of repairing the radial row assembly.

20. The method of claim 19, wherein the step of repairing the radial row assembly comprises installing a plurality of new radial rollers.

21. The method of claim 19, wherein the step of repairing the radial row assembly comprises:

removing a middle outer ring of the outer ring assembly;

removing and replacing inner and outer races of the radial row assembly;

re-installing the middle outer ring of the outer ring assembly; and installing a plurality of new radial rollers.

22. The method of claim 18, further comprising the steps of:

removing a middle outer ring of the outer ring assembly;

axially raising the inner ring assembly relative to the vessel;

removing a plurality of support rollers from the support row assembly; and repairing the support row assembly.

23. The method of claim 22, wherein the step of repairing the support row assembly comprises installing a plurality of new support rollers.

24. The method of claim 22, wherein the step of repairing the support row assembly comprises:

removing and replacing upper and lower races of the support row assembly; and installing a plurality of new support rollers.

* * * * *

UNITED STATES PATENT AND TRADEMARK OFFICE
CERTIFICATE OF CORRECTION

| | |
|---|---|
| PATENT NO. | : 10,046,834 B1 |
| APPLICATION NO. | : 15/678905 |
| DATED | : August 14, 2018 |
| INVENTOR(S) | : Stephen P. Lindblade and William Louis Fontenot |

It is certified that error appears in the above-identified patent and that said Letters Patent is hereby corrected as shown below:

In the Claims

Column 10, Line 1, "the" should be changed to --a--.

Signed and Sealed this
Ninth Day of July, 2019

Andrei Iancu
*Director of the United States Patent and Trademark Office*